Patented Apr. 14, 1936

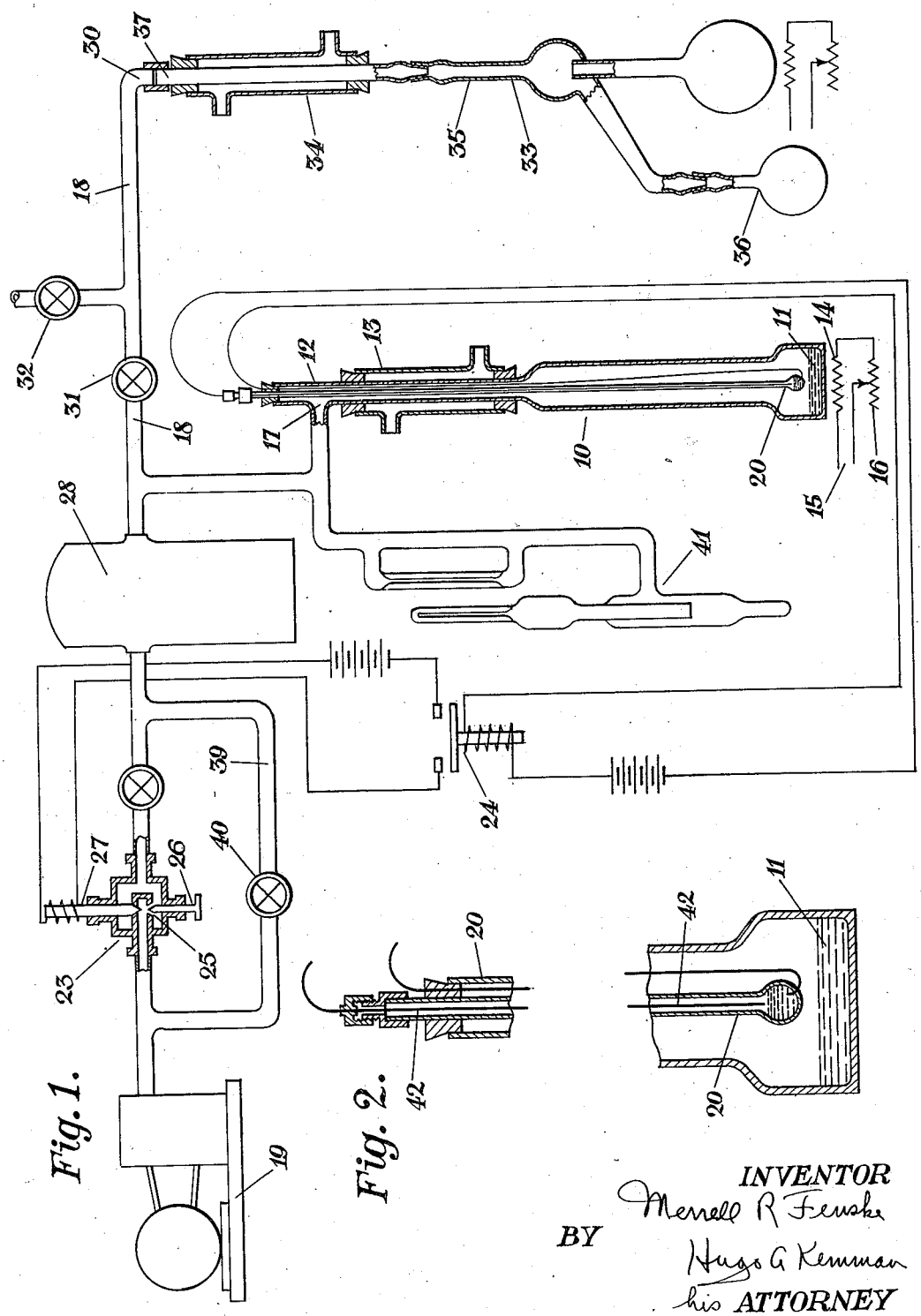

2,037,125

UNITED STATES PATENT OFFICE 2,037,125

PRESSURE CONTROL

Merrell R. Fenske, State College, Pa., assignor to Pennsylvania Petroleum Research Corporation, a corporation of Pennsylvania Application September 6, 1933, Serial No. 688,415

14 Claims. (Cl. 50—10)

This invention pertains generally to pressure regulation and particularly to a method and apparatus for obtaining a high degree of precision in such regulation.

The invention is particularly useful in connection with the maintenance of a constant extremely high vacuum or in other words a precisely controlled very low value of absolute pressure, and will be so described. However, it is to be understood that the invention is applicable to the control of any desired pressure whether it is above or below atmospheric pressure.

Prior to my invention, as far as I am aware, it was impossible to precisely maintain pressures below about 10 millimeters of mercury with the methods and apparatus then existing although such prior art methods and apparatus were generally suitable for pressures above such point.

A precisely controlled extremely high vacuum is often desired for instance in the distillation or fractionation of mineral oils containing high boiling constituents so that more of the high boiling fractions of an oil may be separated without danger of cracking due to high temperatures.

In order to obtain a close cut in any distillation process, it is necessary to closely control the pressure, since, as previously alluded to, the boiling temperature of any fraction is a function of the pressure.

Many devices for the control of pressure respond directly to the pressure under control. To operate such devices a certain pressure differential is required which remains substantially constant regardless of the pressure. When dealing with extremely low absolute pressures, for instance pressures of the order of 1 millimeter of mercury, this pressure differential becomes of relatively large magnitude compared to the pressure under control, the result of which is that the regulation becomes extremely poor and the results are generally unsatisfactory.

To overcome these shortcomings of prior art devices I have perfected a control which responds to the temperature of a boiling liquid, the boiling temperature of which is a function of the pressure under control. Since the boiling temperature of a liquid changes rapidly, with small changes in pressure, particularly at very low pressures, a relatively large temperature differential is afforded with minute changes in pressure with the result that an extremely satisfactory regulation is obtained.

Other features of my invention reside in the construction, arrangement, and combination of parts and in the steps, and combinations and sequences of steps, all of which together with further features will become more apparent to persons skilled in the art as the specification proceeds and upon reference to the drawing in which:

Figure 1 is a diagrammatic illustration of an embodiment of my invention.

Figure 2 is a section, shown broken, of the liquid containing flask and appurtenances.

Referring more particularly to the drawing, at 10 is shown a flask containing a liquid 11. Flask 10 or its equivalent may be of any suitable shape and type and is shown provided at its top 12 with cooling means illustrated as a condenser 13 to cause preferably the complete reflux of vapors from the liquid 11. Liquid 11 is brought to and maintained at a boiling temperature by any suitable heating means such as the grid 14 which is supplied with electric energy from a source 15 through a control 16.

Flask 10, at any suitable point above the liquid 11, has an opening 17 which is connected to the low pressure line 18. Line 18 is connected to any suitable exhausting means such as the vacuum pump 19.

A heat responsive device is associated with the interior of flask 10 and preferably responds to the temperature of the vapors therein at a point directly above the liquid 11. This device is illustrated as a temperature controlled switch 20 which may be of any approved type, but is preferably relatively sensitive when a very close control is desired. The particular switch illustrated is of the mercury type and is well known in the art. Any other suitable heat responsive device might be substituted. For instance it would be possible to substitute a thermocouple, or any other similar device.

Line 18 is provided with a valve 23 adjacent the exhausting means 19. Valve 23 is controlled by said heat responsive device. As illustrated, valve 23 is electrically controlled and opens and closes to control the pressure in line 18 in response to the opening and closing of switch 20 due to changes in temperatures of liquid 11. Valve 23 would respond in a similar manner to any other heat responsive device.

To limit the current at the contacts of the switch 20 a relay 24 is inserted between the switch 20 and the valve 23. Relay 24 may be of any desired type for instance of the Bunnell, the vacuum tube, or other similar type.

Valve 23 may also be of any desired type. The particular valve illustrated is provided with a by-pass 25 having an adjustment 26. By-pass 25 provides for a minimum continuous flow from line 18 to exhausting means 19. This minimum flow is adjusted so as to be below the demands of the system caused by natural leakages or otherwise. The control element 27 is adapted to open and close to control the flow above this minimum. With this arrangement relatively abrupt changes in pressure in line 18 due to the opening and closing of valve 23 are minimized. To further even out changes in pressure a cushioning tank 28 or other similar means may be inserted in line 18.

Line 18 at its inlet 30 is illustrated as having a shut off valve 31 and a vacuum release valve 32.

It is obvious that line 18 may be connected to any apparatus for the purpose of maintaining the desired absolute pressure therein. As illustrated line 18 is connected to a distilling flask 33 provided with a condenser 34 which causes all of the vapors to condense. The condensed liquid flows down the sides of the column 35 and is collected at 36. With this arrangement no vapors flow through the opening 37 after the desired absolute pressure is attained. Therefore, if it were not for natural leakage in line 18 and associated parts which as a practical matter cannot be overcome in the ordinary vacuum system, the control when connected to apparatus delivering no vapor such as illustrated, would build up the required vacuum and then cease to operate because of the absence of any further demand. However, it is found that natural leakage is such as to require the repeated operation of valve 23.

When operating with pressures above atmospheric the exhausting means 19 is substituted by positive pressure means. Diagrammatically this might be illustrated by reversing the connections of the pump at 19.

It is to be kept in mind that the precision of the instrument increases with decrease in pressure because increasingly larger temperature changes take place per unit change in pressure as the pressure decreases. This may be expressed mathematically as follows:

$$\frac{dP}{dT}=\frac{\Delta H}{T\Delta V}$$

in which P is the pressure, T is the temperature, H is the mol heat of vaporization and V is the change in volume accompanying the change from the liquid to the vapor phase; or less accurately by the equation $$\frac{d\log P}{dT}=\frac{\Delta H}{RT^2}$$

in which R is the gas constant.

The above relation is sometimes expressed by the relation, $\log P = M/T + C$, which is sufficiently accurate for most purposes. This latter equation in which M and C are constants illustrates the fact that a given percentage change in P is accompanied by approximately the same change in T regardless of the absolute value of P.

It can be seen, therefore, that for very small values of P, the actual value of P changes only a very small amount with the same change in T.

This might be illustrated by considering the change that takes place in the boiling temperature of a given liquid with the same percentage change in pressure. The changes in the boiling temperature of diphenyl methane with 100% changes in pressure are shown in the following table:

| Pressure change | Temperature change |
|---|---|
| Mm. | °C. |
| 100 to 200 | 20 |
| 10 to 20 | 17 |
| 1 to 2 | 13 |
| .1 to .2 | 11 |

Liquid 11 is preferably of a high degree of stability and of a constant boiling temperature and may be a single substance or a mixture of any desired substances provided the desired conditions are met. I find that diphenyl methane is very satisfactory. It does not decompose nor react with air nor does it dissolve air to any appreciable extent. However, any liquid substance might be employed whether it is constant boiling and/or stable or not, particularly if its vapor pressure is suitable.

Switch 20 closes in response to a rise in temperature of liquid 11 due to a rise in pressure in line 18 consequently in flask 10. This in turn closes the output circuit of relay 24, causing control member 27 to open. As the pressure in line 18 and flask 10 decreases the temperature of liquid 11 also decreases and switch 20 opens. This in turn will open the output circuit of relay 24 to allow control member 27 to close. Upon a rise in pressure in line 18 the cycle is repeated.

Other arrangements may be provided to cause the pressure in line 18 to be controlled by the temperature of the liquid 11. My invention makes it possible to control relatively low absolute pressures within very close limits. For instance, one physical embodiment of the device has been used very extensively for maintaining an absolute pressure of 1 millimeter of mercury. It is found that the absolute pressure does not vary beyond the limits of 1.03 and .97 millimeters.

The exhausting means 19 may be of any approved type and obviously should have a capacity to reduce pressure which is equal to the demands of the system. Many commercial vacuum pumps are capable of reducing pressures below 1 millimeter of mercury. In the embodiment described the vacuum pump operates continuously. It is conceivable that the vacuum pump may operate intermittently and might be started and stopped by the output circuit of the relay in place of the opening and closing of valve 23.

For the rapid initial evacuation of line 18 and any connected apparatus a large capacity by-pass 39 around valve 23 may be provided. By-pass 39 is shown controlled by a valve 40. Valve 40 is of course closed when the desired pressure is approached.

An absolute pressure gauge is shown at 41. To control the pressure at any desired point it is merely necessary to adjust the movable contact 42 of switch 20 and check the results on the gauge 41.

The capacity of the vacuum pump will of course be determined by the uses to which the invention is to be put. Since leakages in and about a vacuum tower will usually be greater than those about a flask the capacity of the pump will usually need to be greater. These considerations are fully understood by persons skilled in the art.

While I prefer to place the temperature controlled switch directly above the liquid in a position of rapid heat transfer it is to be understood that it might be otherwise positioned.

When operating at very low pressures for instance, of the order of 1 millimeter of mercury and below I prefer to take all available precautions to avoid superheating of said vapor and to avoid the effects of superheating. For instance, the liquid 11, at these low pressures, preferably should not be of such specific gravity and of such a height in flask 10 as to appreciably increase the pressure on a lower layer of the liquid compared to the pressure on an upper layer of the liquid. This is to avoid any substantial superheating of the vapor for instance of that formed at the bottom of the flask 10. A substance of a specific gravity comparable to that of diphenyl methane is preferred to a substance of a specific gravity comparable to that of mercury when operating at these low pressures. However, the heavier liquids such as mercury might be employed. The question of relative specific gravity becomes of lesser importance as the pressures increase.

Flask 10 is shown with relatively large area at its bottom so that liquid 11 may be spread out over the bottom of flask 10 and may have a relatively small height in the flask.

While I have particularly described and illustrated a single embodiment of the invention it is to be strictly understood that the invention is not limited thereto and that changes, omissions, additions, substitutions and modifications may be made therein within the scope of the claims without departing from the spirit thereof.

The term "substantially constant" as used in the claims to modify the word "pressure" is intended to include not only a pressure which varies about a given point but also a pressure which is absolutely constant.

I claim:

1. Apparatus for controlling relatively constant pressure comprising, an enclosure, means for exhausting said enclosure, a liquid, means for continuously applying the pressure within said enclosure established by said exhausting means to said liquid, means for continuously boiling said liquid, a heat responsive device positioned in the vapors of said liquid and in close proximity to said liquid, means for controlling said exhausting means through said heat responsive device to maintain said pressure substantially constant, means for refluxing the vapors of said liquid, and a cushioning device between said exhausting means of said enclosure.

2. Apparatus for controlling extremely low relatively constant absolute pressures comprising, an enclosure, means for exhausting said enclosure, a highly stable, constant boiling liquid of relatively low specific gravity such as diphenyl methane, a container for said liquid adapted to hold a desired quantity of said liquid at a relatively low hydrostatic head, means for subjecting said liquid to the pressure within said enclosure established by said first-mentioned means, means for boiling said liquid, a heat responsive device associated with said liquid through the vapors emanating therefrom, means for controlling said exhausting means by means of said heat responsive device to maintain said pressure substantially constant, and means for condensing said vapors and for returning the condensate to the main body of said liquid.

3. A process for regulating the pressure of a gas comprising, maintaining a vapor-liquid system so that the temperature of said system is dependent primarily upon the pressure on said system, maintaining said system under the pressure of a gas other than the vapor of said system, and regulating the pressure of said gas through the temperature of said vapor-liquid system.

4. A process for controlling the pressure of a gas comprising, maintaining a vapor-liquid system in which the vapor is at least substantially saturated and at least substantially in equilibrium with the liquid so that the temperature of said vapor-liquid system is a function of the pressure on said vapor-liquid system, subjecting said system to the pressure of a gas other than the vapor of said system so that the temperature of said system will rise and fall with rise and fall respectively in the pressure of said gas, said liquid being of a character such that said gas has no material effect on said vapor-liquid system other than through its pressure, and controlling the pressure of said gas through the temperature of said vapor-liquid system.

5. A process for regulating the pressure of a gas on a closed system comprising, maintaining a vapor-liquid system in a manner such that the temperature of said vapor-liquid system is dependent at least substantially entirely upon the pressure on said vapor-liquid system, joining said first and second systems through a gas other than said vapor in a manner such that the pressure on said first and second systems is dependent at least substantially entirely upon the pressure of said gas, and regulating the pressure of said gas through the temperature of said vapor-liquid system by causing said pressure of said gas to fall and rise about the desired point in response to rise and fall respectively of the temperature of said vapor-liquid system about its point in temperature corresponding to the desired point in pressure.

6. A process for regulating the pressure of a gas on a closed system comprising, maintaining a vapor-liquid system in a manner such that the temperature of said vapor-liquid system is dependent at least substantially entirely upon the pressure on said vapor-liquid system, said vapor and said liquid being non-decomposable and non-rectifiable in said vapor-liquid system, joining said first and second systems through a gas other than said vapor in a manner such that the pressure on said first and second systems is dependent at least substantially entirely upon the pressure of said gas, and regulating the pressure of said gas through the temperature of said vapor-liquid system.

7. A process for regulating the pressure of a gas on a closed system comprising, maintaining a vapor-liquid system in a manner such that the temperature of said vapor-liquid system is dependent at least substantially entirely upon the pressure on said vapor-liquid system, said vapor and said liquid being highly stable and non-rectifiable in said vapor-liquid system, joining said first and second systems through a gas other than said vapor in a manner such that the pressure on said first and second systems is dependent at least substantially entirely upon the pressure of said gas, said liquid being of a character such that said gas has no material effect on said vapor-liquid system other than through its pressure, and regulating the pressure of said gas through the temperature of said vapor-liquid system.

8. A process for maintaining an at least substantially constant subatmospheric pressure in an enclosure comprising, establishing a vapor-liquid system in a manner such that the temperature of said vapor-liquid system is dependent at least almost entirely upon the pressure on said vapor-liquid system, said vapor and said liquid being highly stable and non-rectifiable in said vapor-liquid system, said vapor in said vapor-liquid system being continuously generated by vaporization of said liquid with heat and said liquid in said vapor-liquid system being continuously regenerated by condensation of said vapor, joining said enclosure and said vapor-liquid system through a gas in a manner such that the pressure in said enclosure and on said vapor-liquid system is dependent at least almost entirely upon the pressure of said gas, said liquid being of a character such that said gas has no material effect on said vapor-liquid system other than through its pressure, and regulating the exhausting of said enclosure and thus the pressure of said gas through the temperature of said vapor-liquid system to maintain said pressure of said gas at least substantially constant.

9. Apparatus for regulating the pressure of a gas comprising, a liquid, means for maintaining said liquid and its vapor in a vapor-liquid system in which the temperature of said system is dependent primarily upon the pressure on said system, means for maintaining said vapor-liquid system under the pressure of said gas, said gas being other than said vapor, and means for regulating the pressure of said gas through the temperature of said vapor-liquid system.

10. Apparatus for controlling the pressure of a gas comprising, an enclosure, a second enclosure, said gas being common to said enclosures, a liquid in one of said enclosures, means for boiling said liquid to establish a vapor-liquid system, means for applying the pressure of said gas to said vapor-liquid system to cause the temperature of said system to rise and fall with rise and fall respectively in the pressure of said gas, and means responsive to the temperature of said vapor-liquid system for controlling the pressure of said gas.

11. Apparatus for regulating the pressure of a gas comprising, an enclosure, a vapor-liquid system, means for maintaining said enclosure and said vapor-liquid system under the pressure of said gas, said gas being other than said vapor, means for continuously generating the vapor of said vapor-liquid system by boiling the liquid of said system, means for continuously regenerating the liquid of said vapor-liquid system by condensing the vapor of said system, and means responsive to the temperature of said vapor-liquid system for regulating the pressure of said gas.

12. Apparatus for regulating gas pressure comprising, an enclosure for containing a gas, means for exhausting gas from said enclosure, a vapor-liquid system, means for subjecting said vapor-liquid system to the pressure of the gas in said enclosure, means for boiling the liquid of said vapor-liquid system to generate the vapor of said system, means for condensing the vapor of said vapor-liquid system to regenerate the liquid of said system, and means responsive to the temperature of said vapor-liquid system for controlling said first mentioned means.

13. In combination, a low pressure line, a flask connected to said low pressure line, liquid in said flask, means for boiling said liquid, means for totally condensing the resulting vapors, exhausting means connected to said low pressure line, and means responsive to the boiling temperature of said liquid for controlling said exhausting means.

14. In combination, a low pressure line, a flask connected to said low pressure line, a highly stable constant boiling liquid in said flask, means for boiling said liquid, means for condensing the resulting vapors, a continuously operating vacuum pump connected to said low pressure line, a valve between said vacuum pump and said low pressure line, and means responsive to the boiling temperature of said liquid for opening said valve with rise in pressure in said low pressure line above the desired value and for closing said valve with fall in said pressure below the desired value.

MERRELL R. FENSKE.